United States Patent Office 3,414,709
Patented Dec. 3, 1968

3,414,709
APPARATUS FOR RE-HEATING FOODS
PREVIOUSLY COOKED
Yves Tricault, 23 Blvd. de Montmorency,
Paris XVI, France
Filed July 30, 1965, Ser. No. 476,068
Claims priority, application France, Aug. 3, 1964,
983,969; Oct. 30, 1964, 993,260
3 Claims. (Cl. 219—411)

ABSTRACT OF THE DISCLOSURE

Apparatus for reheating previously cooked foods which includes a receptacle including a lower dish made of a material of low heat conductivity and of high specific heat and an upper metallic dish cover resting on the rim of the lower dish to cover the food but maintained out of physical contact with the food, and sources of infra-red radiation for subjecting the receptacle to such radiation from both above and below the receptacle. The trays are stored and transported in a wheeled oven-cart. The cart has vertically spaced exposed shelves at one end on which trays may be placed for inter-leaving between vertically spaced sets of radiant heaters mounted on a co-operating wheeled apparatus.

---

Figure 1:
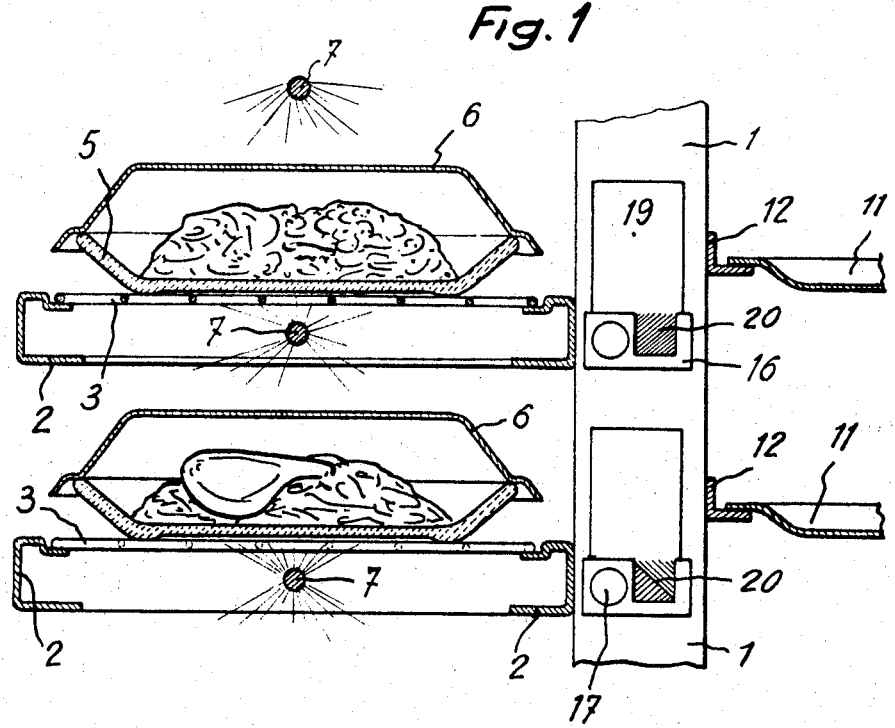

Food menus always include hot foods and cold foods, and one of the problems of every cook is to serve foods to the customer at the desired temperature.

This proper temperature is still more difficult to provide where restaurants, canteens and other communal services are involved. In these cases, in effect, there is a significant "thermal delay." By "thermal delay" is meant the lapse of time between the moment a meal is prepared and the moment it is served. In large charitable institutions the thermal delay is at least one hour, which requires that the consumption temperature for hot foods (60 to 65° C.) be maintained during the same span of time.

It is known that foods transported collectively in special isothermal or heating receptacles undergo the thermal delay without ill effect, but that this is not the case for portions transported individually because, regardless of the system by which the selected temperature is maintained (insulation, heating by accumulation or by radiant heating, etc.) the food becomes dry and loses its flavour.

The present invention remedies all of these short-comings and permits meals to be served at the proper temperature, without modifying the flavour or the appearance of having been served immediately after cooking, while at the same time simplifying the serving of the meal even that for quite small portions, such that the invention finds application as well in private households as in restaurants, canteens and other communal services.

The problem of re-heating a cooked food which has been susequently cooled to the ambient temperature, in order to raise it to the consumption temperature (around 60° C.), is entirely different from that of maintaining the temperature of a dish which has just been cooked.

In order for a food which has been cooked, cooled and subsequently re-heated to preserve all of the qualities of food that has just been prepared, it is essential to observe the following conditions:

(1) No portion of the cooked food should be raised to a temperature above the consumption temperature of about 60° C., but on the other hand the entirety of the food must be raised to that temperature of 60° C.

(2) During the re-heating, no constituent of the food (juices and fatty material) should evaporate, as happens in standard processes either by way of free evaporation into the atmosphere if the food is re-heated in an uncovered plate, or through condensation on the dish-cover if the latter is at a temperature beneath the evaporation temperature.

To this end, the invention has for an object to provide an apparatus for re-heating foods previously cooked, comprising at least one receptacle for containing the food, said receptacle including a lower dish made of a material of low heat conductivity and of high specific heat, and an upper dish-cover resting on the rim of said lower dish to cover the food, said upper dish cover being made of a metallic material of low specific heat, and radiant means for subjecting the receptacle to infra-red radiation from both above and below the receptacle.

It is contemplated to provide a plurality of such receptacles disposed on superimposed trays, above and below each of which are mounted infra-red radiation tubes.

The trays are preferably disposed within a closed enclosure forming an oven, and the oven is carried on a cart which includes a compartment enclosing the serving-trays upon which the re-heated dishes are to be served to the customer.

The result of this arrangement is that the lower plate of refractory material is uniformly raised to a limited temperature of 60–70° C. by infra-red radiation, and that the dish-cover of conductive material covering the plate becomes heated responsive to the thermal infra-red rays and effects reradiation of heat into the food in order to heat the latter to the desired temperature, while being itself raised to a temperature which is always above that of the food so that condensation becomes impossible.

According to one embodiment, the re-heating assembly is itself formed of two separately transportable parts, the one containing the grills which support the re-heating receptacles and possibly the serving-trays, the other containing the infra-red tubes, these two elements being adapted to fit snugly against one another so that, when desired, the oven-forming enclosure can be created.

Further characteristics of the invention will appear from the following detailed description having reference to the accompanying drawings. The description and the drawings are given as examples only, and are not to be construed as limiting the invention.

Figure 3:
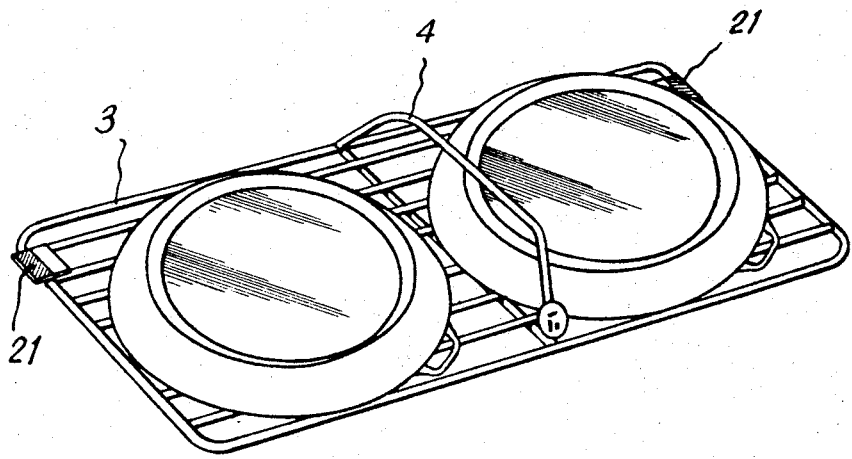
Figure 2:
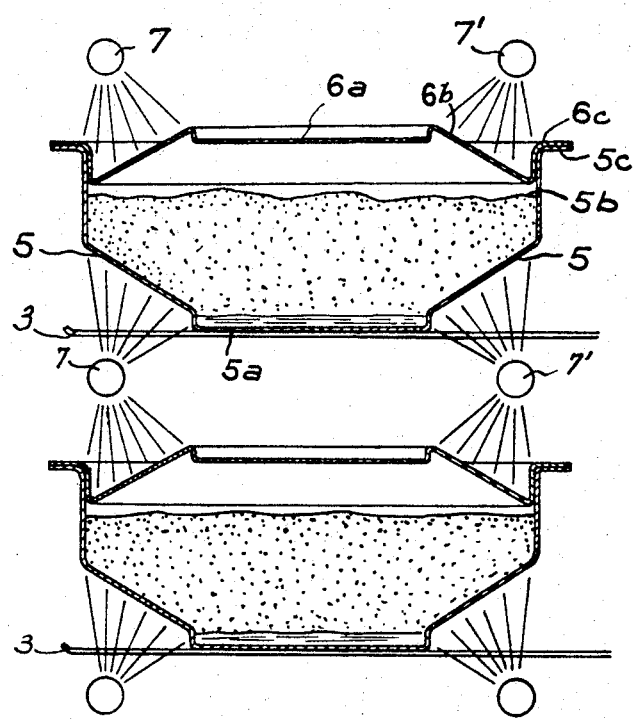
Figure 4:
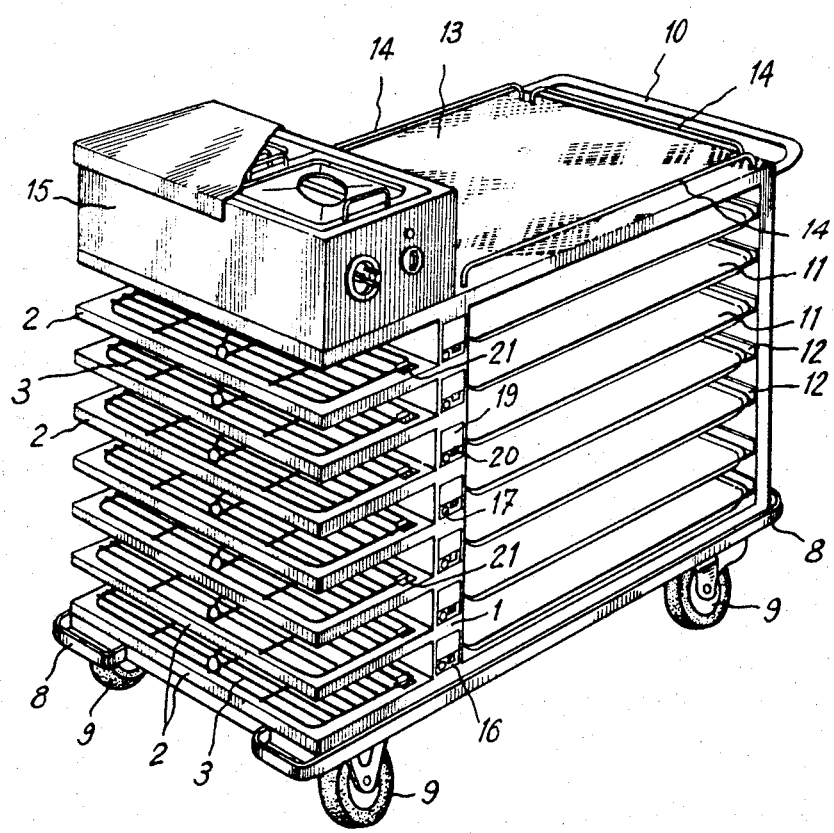
Figures 5, 6:
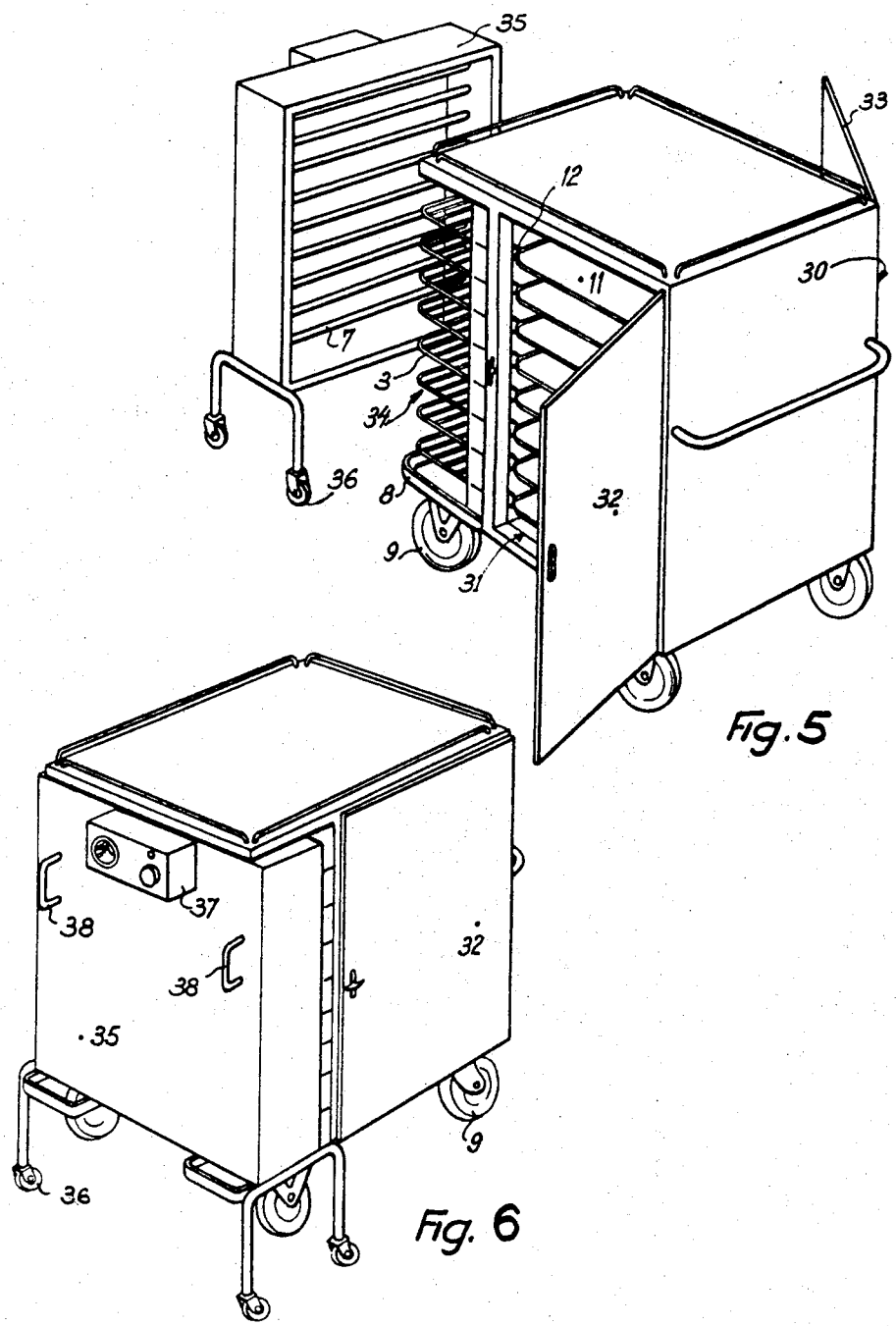

FIG. 1 is a schematic, sectional view of a re-heating part according to the invention, FIG. 2 is a similar sectional view of one variant, FIG. 3 is a perspective view of a grill carrying two portions, FIG. 4 is a perspective view of an apparatus assembled according to the invention, and FIGS. 5 and 6 show one variant of this apparatus, comprising two parts, before and after coupling, respectively.

Referring to the figures, it can be seen that the re-heating device properly speaking comprises a fixed frame 1 to which are fixed superimposed support trays 2. On each of the latter is positioned a grill 3 having a grasping handle 4 and receiving the receptacles which contain the food portions, that is, the cooked food to be re-heated; each portion is placed in a thick porcelain dish 5 which is covered by a dish-cover 6 of unoxidizable metal.

It was found that for the heating of the dish-cover it was preferable to employ infra-red rays which have less tendency than the luminous infra-red rays to reflect off the outer surface of the dish-cover, and in consequence reradiate heat better into the interior of the dish-cover and into the food that the latter encloses.

The food portions, heated partly through the dish 5 and partly through the dish-cover 6, are transported to the location where they are to be served without taking special precautions to avoid cooling. They are then re-heated by the tubes 7. Due to the provision of the thick dish 5 and of the dish-cover 6, the temperature rise takes place in isolation and is such that it is impossible for condensation to take place on the interior of the dish-cover, the properties of the latter being such that during the re-heating it is raised by the infra-red radiation to a temperature above that of the contained food. The foodstuffs do not dry; they preserve their initial flavour; they are protected from direct infra-red radiation from the tubes 7 which could destroy certain vitamins.

FIG. 2 shows one variant according to which the dishes 5 disposed on the grills 3 with their dish-covers 6 have a special form and are subjected to radiation beamed from four tubes.

The bottom of these dishes includes a portion 5a which is hollow and alveolate, and which is intended to collect the juices or sauces draining from the foods contained in these dishes.

The lateral walls of the dish in direct contact with the food are inclined and have a vertical extension 5b and a horizontal rim 5c.

The dish-cover 6 fitting on these dishes has at its center a recessed portion 6a adapted to receive the hollow portion 5a of the dishes, permitting either the resting of the dish upon the dish-cover at the time the former is being used, or the stacking of several dish-and-cover units. It has also an inclined portion 6b and a rim 6c fitting on the edge 5c of the dish.

In this embodiment of the dish-and-cover unit, the heating tubes are laterally disposed in pairs 7 and 7', the rays from which heat the inclined walls of the dish and dish-cover, but do not heat the hollow part 5a, so as to avoid re-heating the juices or sauces contained in that part in a way harmful to their flavour.

Where the apparatus according to the invention is employed in a private household, the heating unit which has just been described is placed in a kind of oven of small dimensions, located in the dining room, and transportation of the dishes closed by their dish-cover can be done by hand.

On the other hand, where the apparatus is to be employed in a restaurant, a canteen or any other community, it is advantageous to use a cart which permits the handling of a large number of servings.

Referring to FIG. 4, such a cart is seen to include a frame 8 mounted on two wheels 9 and having a manoeuvering handle 10.

The frame 1 supports two distinct compartments, one situated at the rear and receiving serving-trays 11 resting on lateral slide-bars 12, the other situated towards the front and constituting a set of shelves of the kind shown in FIG. 1.

The upper deck 13 of the cart is surrounded on three sides by a moulding 14, while the fourth side is defined by a heating device 15 of the "bain-marie" type using hot air.

This cart is used in the following way:

In the rear compartment is placed a quantity of serving-trays corresponding to one-half or one-third of a hospital section. The bain-marie device 15 contains the soup as well as the supplement of vegetables or potatoes. The upper deck 13 carries the empty soup bowls and the beverages, for example.

The conditioning of the plates is carried out preferably by means of grills 3 holding two plates apiece. When the cart has been completely prepared, it is brought to the consumption area, and an electric supply cord with which the cart is provided is plugged into the local circuit in order to feed not only the bain-marie 15 but also the different infra-red tubes 7. Regardless of the length of time the portions have been sittting, the heating apparatus permits the food to be raised to the desired temperature, that is about 60 to 65° C., in approximately 10 minutes.

In hospitals, the composition of menus is a particularly delicate matter since the patients must often follow very special diets, such that hitherto, the preparation of each cart necessitated a long and delicate procedure. As the invention requires that the foods be enclosed between a dish and a metallic dish-cover, this problem is the more complicated because the nurse cannot directly observe the food she is looking for and it would be completely irrational to raise the dish-covers one by one to check the contents of the dish 5.

It is for this reason that, according to the invention, there is provided a marking or reference system by index cards which simplifies the organization and prevents any error. This system is set up in the following way:

On the column 1, and opposite each serving-tray 11, there is a card-holder 16 with its engraved numeral 17. In the apparatus shown, where there are seven levels of two serving-trays each, the numerals 17 go from one to fourteen.

Cardboard cards 19 carry at their lower portion a band of colour 20 or a simple mark codifying the menu composition, that is, signifying that the foodstuffs placed on a given serving-tray 11 correspond to a normal or to a special diet. These cards carry the number of the room or of the bed and possibly that of the patient as well. The card-holder 16 has a window through which the coloured band 20 appears.

To index the hot servings on the grills 3, metallic plates are used which follow the same code-colour system and which are inserted in the jaws 21 soldered at the edge of the grills 3.

This system functions in the following way:

From the outset, it is the head nurse who sets up the cart, that is she arranges in place the different cards in the order that she wants the distribution carried out. This order can be the chronological order of the rooms, or any other disposition that to her seems more practical. Her decision in the kitchen is thus recorded on the cart itself and no one else can now touch or change the cards. Naturally this arrangement is set up one meal in advance, at noon for the evening meal and at night for the next day's breakfast.

Simultaneously with the setting up of the cards, it is necessary to arrange the corresponding marking plates on the dish-supporting grills.

If the head nurse wishes to change the menu of a patient in the course of his stay, it suffices merely to install another card having the desired colour band.

The carts sent to the kitchen are, of course, lined up in the sorting hall and the different menus are collected for the disposition of the chef.

Obviously it would be advantageous to close in the re-heating assembly at the left portion of FIG. 2 so as to avoid heat loss. The embodiment of FIGS. 5 and 6 shows one way of accomplishing this.

The re-heating assembly of FIGS. 5 and 6 comprises two elements:

A first element constituted by the transporting cart 30, formed as shown in FIG. 1 by a frame 8 mounted on wheels 9 and having, on the one hand, a compartment 31 for receiving the serving-trays 11 and closed preferably by two doors 32 and 33, and, on the other hand, a second arrangement 34 provided with grills 3 for supporting the re-heating dishes;

A second element 35 also mounted on castors 36 and within which are fixed the infra-red tubes 7, the frontal face of the element 35 carrying an electrical connection box and manoeuvring handles 38.

The tubes 7 and possibly 7' are disposed in such a way as to fit above and below each grill, so that the dishes contained thereon can be re-heated when the carts 30 and 35 are fitted together, the wall panels of the two carts fitting snugly against one another so as to form a sealed enclosure constituting the re-heating oven.

Aside from the fact that the foodstuffs are re-heated in a closed space forming an oven, this arrangement has the advantage that the electrical apparatus comprising the tubes can be employed with any of several carts and does not need to be transported with each cart on long trips with all the attendant risks of tube deterioration.

Moreover, this arrangement has the advantage of doing away with electrical outlets in the kitchen—there is thus no manipulation or deterioration of the electrical plugs by the kitchen staff—and also of permitting greater specialisation of kitchen personnel and of meal-serving personnel.

The invention is not to be construed as limited to the described and shown embodiments only, but rather as covering all of the variations thereof. In particular, an arrangement could be set up with a plurality of ovens grouped for example to form a single movable unit, but independent one from the other.

What I claim is:

1. Apparatus for reheating food previously cooked, comprising at least one receptacle for containing the food, said receptacle including a lower dish made of a material of low heat conductivity and of high specific heat, and an upper dish-cover resting on the rim of said lower dish to cover the food, said upper dish-cover being made of a metallic material of low specific heat responsive to infrared radiation to reradiate heat to the food within the receptacle, said dish-cover being spaced out of contact with the food, said lower dish and said upper dish-cover each having flat central portions merging with inclined lateral walls, and radiant means for subjecting the receptacle to infrared radiation comprising infrared radiation tubes disposed in pairs above and below the two components of the receptacle, disposed so that the radiation from said tubes primarily heats said inclined lateral walls.

2. Apparatus as claimed in claim 1, further comprising two separately mobile parts, of which the one has a plurality of superimposed trays for receiving the receptacles, and of which the other contains a plurality of infra-red radiation tubes constituting the radiant means, said two parts being adapted to fit tightly against each other to form an oven-like enclosure with said tubes interleaving with said trays.

3. Appaartus as claimed in claim 2, wherein the part having the trays is provided with card-holders and includes a compartment containing serving-trays.

References Cited

UNITED STATES PATENTS

| | | |
|---|---|---|
| D. 196,003 | 8/1963 | Miller et al. |
| 3,079,912 | 3/1963 | Griem. |
| 3,261,343 | 7/1966 | Tibell. |
| 3,304,406 | 2/1967 | King _____ 219—411 |

FOREIGN PATENTS 476,787   9/1951   Canada.

RICHARD M. WOOD, *Primary Examiner.*

R. F. STAUBLY, *Assistant Examiner.*